US009434646B2

(12) United States Patent
Pasquier et al.

(10) Patent No.: US 9,434,646 B2
(45) Date of Patent: Sep. 6, 2016

(54) PHOSPHORUS-DOPED SULFO-BELITIC CLINKER

(71) Applicant: VICAT, Paris la Defense (FR)

(72) Inventors: Michel Pasquier, Lyons (FR); Laury Barnes-Davin, Voiron (FR); Pascal Meric, Bourgoin-Jallieu (FR); Guy Beauvent, Weirre Effroy (FR)

(73) Assignee: VICAT, Paris la Defense (FR)

( * ) Notice: Subject to any disclaimer, the term of this patent is extended or adjusted under 35 U.S.C. 154(b) by 39 days.

(21) Appl. No.: 14/776,990

(22) PCT Filed: Mar. 13, 2014

(86) PCT No.: PCT/FR2014/050570
§ 371 (c)(1),
(2) Date: Sep. 15, 2015

(87) PCT Pub. No.: WO2014/140487
PCT Pub. Date: Sep. 18, 2014

(65) Prior Publication Data
US 2016/0031756 A1 Feb. 4, 2016

(30) Foreign Application Priority Data
Mar. 15, 2013 (FR) .................. 13 52321

(51) Int. Cl.
C04B 28/06 (2006.01)
C04B 7/32 (2006.01)
C04B 7/345 (2006.01)
C04B 111/00 (2006.01)

(52) U.S. Cl.
CPC ............. C04B 7/323 (2013.01); C04B 7/3453 (2013.01); C04B 28/065 (2013.01); C04B 2111/00215 (2013.01); Y02P 40/148 (2015.11)

(58) Field of Classification Search
CPC ....... C04B 7/32; C04B 7/345; C04B 7/3453; C04B 28/025; C04B 28/06
See application file for complete search history.

(56) References Cited

U.S. PATENT DOCUMENTS 7,850,776 B2 * 12/2010 Gartner .................. C04B 7/323
106/692
8,177,903 B2 * 5/2012 Walenta ................ C04B 28/065
106/692
8,317,915 B2 * 11/2012 Walenta .................. C04B 7/323
106/692
8,568,528 B2 * 10/2013 Barnes-Davin ......... C04B 7/323
106/739
8,715,411 B2 * 5/2014 Martinez .................. C04B 7/02
106/692

FOREIGN PATENT DOCUMENTS

FR 2941448 A1 7/2010
WO 2006018569 A2 2/2006
WO 2009122065 A2 10/2009
WO 2010086555 A1 8/2010
WO 2012010800 A1 1/2012
WO WO 2012/065976 A1 * 5/2012

OTHER PUBLICATIONS

Chen et al. "Understanding expansion in calcium sulfoaluminate-belite cements." Cement and Concrete Research 2012. vol. 42. pp. 51-60.
El-Didamony et al. "Characteristics of cement pastes containing sulphoaluminate and belite prepared from nano-materials." Construction and Building Materials 2013. vol. 38 pp. 14-21.
Sep. 15, 2015 International Report on Patentability issued in International Patent Application No. PCT/FR2014/050570.
Apr. 24, 2014 International Search Report issued in International Patent Application No. PCT/FR2014/050570.
Pelletier-Chaignat et al. "Beneficial use of limestone filler with calcium sulphoaluminate cement." Construction and Building Materials 2012. vol. 26. pp. 619-627.

* cited by examiner

Primary Examiner — Anthony J Green
(74) Attorney, Agent, or Firm — Oliff PLC

(57) ABSTRACT

A new phosphorus-doped sulfo-belite-based clinker, a method for preparing this clinker, as well as the use of the clinker for preparing a hydraulic binder and, later on, grout, concrete or mortar.

16 Claims, 1 Drawing Sheet

Baking profile

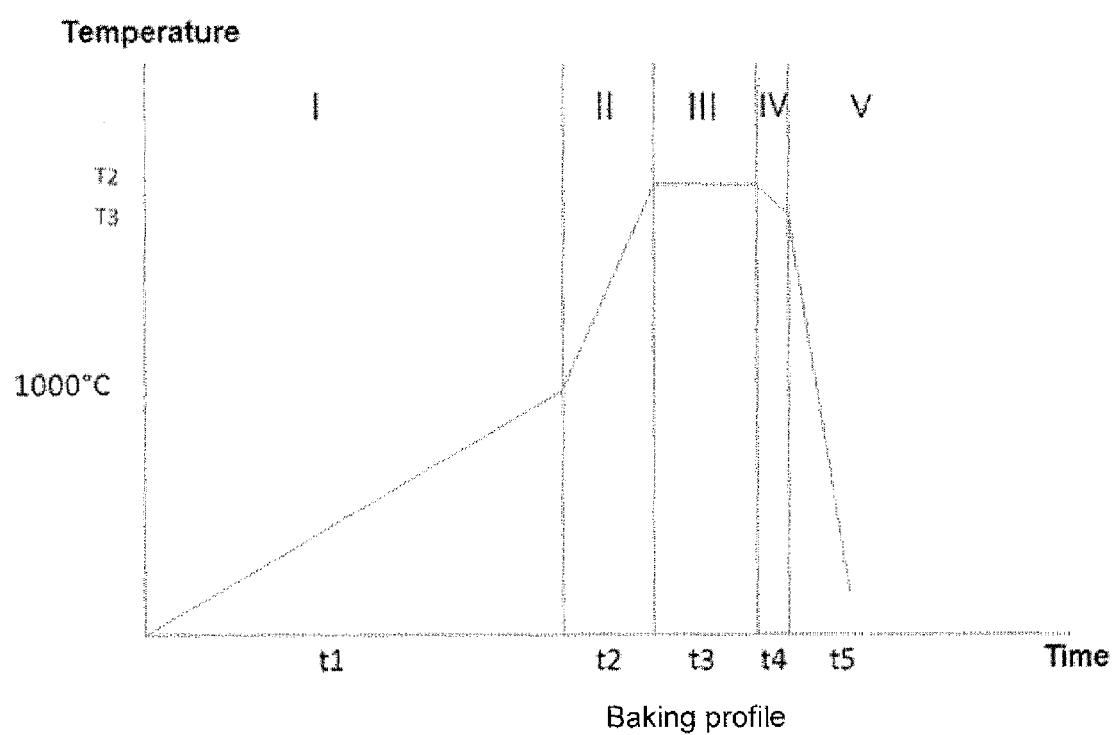
Baking profile

PHOSPHORUS-DOPED SULFO-BELITIC CLINKER

The present invention relates to a new phosphorus-doped sulfo-belite-based clinker, a method for preparing this clinker, as well as the use of the clinker for preparing a hydraulic binder and, later on, grout, concrete or mortar.

BACKGROUND

The manufacture of hydraulic binders, and cements in particular, consists essentially in a calcination of a mixture of raw materials which have been judiciously selected and proportioned, also designated by the term "raw mix". Baking this raw mix gives an intermediate product, a clinker, which, when milled with possible mineral additions, produces cement. The type of cement produced depends on the nature and proportions of raw material as well as the baking method. There are distinguished several types of cements: Portland cements (which represent the greatest majority of cements produced in the world), aluminate cements (or calcium aluminate)? natural quick-setting cements, sulfa-aluminate cements, sulfo-belite cements and other intermediate varieties. As these families are not entirely separate, it is preferable to describe them by their chemical and mineralogical constituents.

The most widespread cements are Portland cements. Portland cements are obtained from Portland clinker, obtained after clinkering at a temperature of the order of 1450° C. of a raw mix rich in calcium carbonate in a furnace.

The drawback of preparing such cements is that they release a lot of $CO_2$. The cement industry is hence today on the lookout for an alternative equivalent to Portland cement, that is to say, cements having at least the same resistance and quality features as Portland cements, but which, during their production, release less $CO_2$.

In this respect, these last few years, research has been oriented towards cements called sulfo-aluminate and sulfo-belite, which, during their production release less $CO_2$ than Portland cements.

The clinker being the result of a calcination at high temperature, the elements are essentially present in the form of oxides. Clinkers allowing the preparation of sulfo-aluminate cements or sulfo-belite cements relate to a method of producing a clinker from a raw mix constituted by a mixture comprising $CaCO_3$, $Al_2O_3$, and/or $Al(OH)_3CaSO_4$, $SiO_2$, $Fe_2O_3$ compounds and/or a product containing silica or silicates such as clay, all these compounds being present in anhydrous or hydrated form, individually or in combination. The raw mix may be prepared with any natural or synthetic mineral materials able to supply calcium, silicon, sulfur, iron and aluminum.

As part of this research, numerous sulfa-alunninate clinkers have been described. It can be cited for example international patent application WO-A-2006/018569 describing sulfo-aluminate belite clinkers comprising 5 to 25% calcium aluminoferrite phase of a composition corresponding to general formula $C_2AF_{(1-x)}$, with x comprised between 0.2 et 0.8; 15 to 35% of a calcium sulphoaluminate "yee' limit" phase ($C_4A_3\$$); 40 to 75% belite ($C_2S$); and 0.01 to 10% of one or several minor phases. As mentioned in this patent application, such clinkers contain, in comparison with the alite phase ($C_3S$), the main component of Portland cements, a higher quantity of belite phase ($C_2S$), which is entirely beneficial, since it leads to reducing industrial emissions of $CO_2$ and energy consumption. However, belite contributes to the development of the long term resistance of belite sulfo-aluminate cement. Nevertheless, most clinkers described in this patent application contain boron, thus being an economic drawback as regards cost and rarity of this constituent.

As to the international patent application WO-A-2012/010800 it describes iron-doped sulfo-belite clinkers comprising from 5 to 60% iron-doped calcium sulfo-aluminate phase corresponding to formula $C_4A_xF_y\$_z$ with x varying from 2 to 3, y varying from 0 to 0.5 and y being different from 0, and z varying from 0.8 to 1.2; from 0 to 25% calcium aluminoferrite phase of a composition corresponding to general formula $C_6A_{x'}F_{y'}$, with x' varying from 0 to 1.5 and y' varying from 0.5 to 3; from 20 to 70% belite $C_2S$ phase; and less than 10% $C_{11}S_4B$ phase. Iron doping is described as allowing the preparation of cements having a hydraulic reactivity and an increased resistance in comparison with clinkers described in the international patent application WO 2006/018569, while allowing to reduce $CO_2$ emissions by almost 35% during their preparation in comparison with Portland type clinkers. In addition, these clinkers do not require the presence of boron nor the addition of additives for improving the quality of the prepared cements and concretes.

The setting time of the hydraulic binders such as cement, and more generally of grout, concrete and mortar prepared from these hydraulic binders, starts from the mixture and kneading when manufacturing them. The transportation hence initiates this setting time and must be as rapid as possible in order to preserve maximum maneuverability of the grout, concrete and mortar during their placing. By way of example, the average time period for the transportation and implementation of the concrete is two hours, beyond this time period, the setting of the concrete has already started and the quality thereof is no longer ensured.

Thus, despite the setting time of the hydraulic binders prepared from clinkers described in the prior art being compliant with the applicable norms, it still remains interesting for those skilled in the art to increase said setting time as much as possible while maintaining the hydraulic reactivity and the resistance of the prepared materials in the short, medium and long term.

It therefore remains interesting to identify new clinkers able to be prepared at temperatures largely lower than 1425° C., thus strongly reducing $CO_2$ emissions during their preparation in comparison with "Portland" clinkers, which allow obtaining hydraulic binders that benefit from an improved setting time while maintaining their hydraulic reactivity and their resistance in the short, medium and long term.

In the past, numerous publications have pointed out the existence of correlation between a rapid setting time and the presence of the $C_4A_3\$$ phase in the clinker. Thus, an article called "Understanding expansion in calcium sulfoaluminate-belite cements", *Cement and Concrete Research* 42 (2012), 51-60, Chen et al. explain that sulfoaluminate-belite cements have shown a rapid setting time due to the reactivity of the $C_4A_3\$$ phase. Similarly, "Characteristics of cement pastes containing sulphoaluminate and belite prepared from nano-materials", *Construction and building materials* 38 (2013) 14-21, El-Didamony et al. state that cements containing anhydrite have a shorter setting time and a better resistance in short deadlines.

SUMMARY

However, it has now been found in an entirely surprising manner that phosphorous doping of certain sulfo-belite clinkers allowed to significantly increase the setting time of the hydraulic binders prepared from these clinkers while having a hydraulic reactivity and a resistance comparable to those of cements prepared from the clinkers described in the international patent application WO-A-2012/010800, and allowing to reduce $CO_2$ emissions by almost 35% during their preparation in comparison with Portland type clinkers.

The present invention hence first relates to a sulfo-aluminate clinker comprising as phase composition, with respect to the total weight of the clinker:

from 5 to 60% calcium sulfo-aluminate phase corresponding to the formula $C_4A_xF_y\$_z$, with:
x varying from 2 to 3,
y varying from 0 to 0.5,
and z varying from 0.8 to 1.2;
from 0 to 25% of a calcium aluminoferrite phase the composition of which corresponds to the general formula $C_6A_{x'}F_{y'}$, with x' varying from 0 to 1.5 and y' varying from 0.5 to 3; and
from 20 to 70% belite $C_2S$ phase; and
less than 10% $C_{11}S_4B$ phase.
said clinker comprising more than 0.3% $P_2O_5$.

BRIEF DESCRIPTION OF THE DRAWING

FIG. 1 is a graph that shows the temperature profile that is followed when proceeding with the baking of the raw mix according to the method of the invention.

DETAILED DESCRIPTION

The clinker according to the present invention allows for preparing hydraulic binders which benefit from a significantly increased setting time in comparison with the hydraulic binders that are prepared from the clinkers described in the prior art, in particular in the international patent application WO-A-2012/010800. In addition, hydraulic binders that are prepared in this manner have a hydraulic reactivity and a resistance comparable to those of the cements that are prepared from the clinkers described in the prior art while allowing to reduce $CO_2$ emissions during their preparation by almost 35% in comparison with Portland-type clinkers.

As part of the present invention, the following notations have been adopted in order to designate the mineralogical components of cement:

C stands for CaO;
A stands for $Al_2O_3$;
F stands for $Fe_2O_3$;
S stands for $SiO_2$; and
$ stands for $SO_3$.

Thus, for example, the calcium aluminoferrite phase, the composition of which corresponds to the general formula $C_6A_{x'}F_{y'}$, actually corresponds to a $(CaO)_6(Al_2O_3)_{x'}(Fe_2O_3)_{y'}$ phase.

In addition, as part of the present invention, the proportions, which are expressed in %, correspond to mass percentages with respect to the total weight of the considered entity (clinker or hydraulic binder).

Preferably, an object of the present invention is a sulfo-belite clinker as defined previously wherein the following features are chosen separately or in combination:
the clinker contains from 10 to 50% of an iron-doped calcium sulfo-aluminate phase $C_4A_xF_y\$_z$;
x varies from 2.1 to 2.9, preferably from 2.2 to 2.8;
y varies from 0.05 to 0.5, preferably from 0.1 to 0.5;
the calcium sulfo-aluminate phase contains alumina, iron and sulfur with x varying from 2.1 to 2.9, preferably from 2.2 to 2.8, y varying from 0.05 to 0.5, preferably from 0.1 to 0.5, and z varying from 0.8 to 1.2;
the clinker contains from 0 to 20% of a calcium aluminoferrite phase $C_6A_{x'}F_{y'}$;
x' varies from 0.65 to 1.3;
y' varies from 1.5 to 2.5;
the calcium aluminoferrite phase $C_6A_{x'}F_{y'}$ contains alumina and iron with x' varying from 0.65 to 1.3 and y' varying from 1.5 to 2.5;
the clinker contains from 30 to 55% $C_2S$ belite phase; and/or
the clinker contains less than 5% of a $C_{11}S_4B$ phase, preferably even less than 2% of a $C_{11}S_4B$ phase. Still more preferably, the clinker is devoid of a $C_{11}S_4B$ phase.

Preferably, the clinkers according to the invention are totally devoid of boron added intentionally.

Hence, the clinker according to the present invention is doped in $P_2O_5$. Preferably, the present invention relates to a sulfo-belite clinker such as defined beforehand containing more than 0.4% $P_2O_5$, preferably more than 0.5% $P_2O_5$, preferably even more than 0.6% $P_2O_5$, in an entirely preferred manner more than 0.7% $P_2O_5$.

Other minor phases may appear in the constitution of the clinker. These minor phases may be constituted by free lime CaOl, anhydrite C$, gehlenite $C_2AS$, mayenite $C_{12}A_7$, periclase MgO, perovskite CT, $C_3FT$, $C_4FT_2$. Preferably, the clinker according to the invention contains:

less than 3% CaOl, preferably less than 1% CaOl;
less than 5% C$, preferably less than 2% C$; and/or
less than 10% $C_2AS$, preferably less than 5% $C_2AS$.

The clinker according to the present invention should be prepared under specific conditions in order to avoid any sticking phenomenon during baking. Thus, another object of the present invention is a method for preparing a clinker as previously described, comprising the following steps:

1) preparing a raw mix from the following raw materials:
from 0.1 to 40% bauxite, marlstones, red muds and/or any other sedimentary, metamorphic or magmatic rocks or industrial mineral derivatives with a high aluminum content;
from 0.1 to 12% gypsum, borogypsum, phosphogypsum, desulphogypsum, anhydrite and/or hemihydrate;
from 0.1 to 65% limestone and/or any phosphatic limestone, and/or any other sedimentary, metamorphic or magmatic rocks or industrial mineral derivatives with a high calcium content;
from 0.1 to 20% of apatite, hydroxyapatite, and/or any phosphate ore, or calcium phosphate or natural or synthetic, mineral or organic, phosphates,
from 0 to 12% quartz, silica, expanded silica, silica fumes or any other sedimentary, metamorphic or magmatic rocks or industrial mineral derivatives with high silicon content; and
from 0 to 12% iron oxide and/or iron sulfate and/or iron sulfides and/or any other natural or synthetic iron-rich and/or sulfur-rich mineral materials;

2) mixing (possibly, by co-grinding) the raw materials,
3) baking the mixture of raw materials at a temperature T2 ranging from 1150° C. to 1300° C. according to the following steps:
a) passage from ambient temperature to a temperature ranging from 800° C. to 1200° C., over a time period t1 ranging from 20 to 500 minutes,
b) raising the temperature to the desired final temperature T2, over a time period t2 ranging from 15 to 60 minutes, c) maintaining the temperature at T2, over a time period t3 ranging from 0 to 80 minutes, d) decreasing the temperature from T2 to T3, T3 being higher than or equal to 1100° C., over a time period t4 ranging from 0 to 15 minutes, e) tempering the clinker and cooling it rapidly to ambient temperature, over a time period t5 ranging from 5 to 60 minutes.

For the sake of clarity, the temperature profile that is followed when proceeding with the baking of the raw mix, according to the method of the invention is illustrated by FIG. 1.

Preferably, the baking step of the method according to the present invention is carried out at a temperature T2 ranging from 1250° C. to 1300° C.

Preferably, the baking step of the method according to the present invention is carried out at a temperature T2, under the following conditions:

a) passage from ambient temperature to 1000° C., over a time period t1 ranging from 90 to 420 minutes, b) raising the temperature to the desired final temperature T2, over a time period t2 ranging from 25 to 45 minutes, c) maintaining the temperature at T2, over a time period t3 ranging from 0 to 70 minutes, d) decreasing the temperature from T2 to 1200° C., over a time period t4 ranging from 5 to 10 minutes, e) tempering the clinker and cooling it rapidly to ambient temperature, in 10 minutes.

The clinker according to the present invention may be prepared from different raw materials such as red muds, bauxite, limestone, marlstones, gypsum or any other source of calcium sulfate, silica, iron oxides, iron sulfate and iron sulfides, whether natural or their industrial byproducts, and any mineral material that can provide CaO, $Al_2O_3$, $Fe_2O_3$, $SiO_2$ and $SO_3$ in adequate amounts or mixtures.

The quality of baking, and in particular, ensuring, in every point of an oxidizing atmosphere and maximum temperatures of 1350° C. is essential. Hence, the preparation of the clinkers according to the invention will be carried out in a furnace that allows meeting these conditions. By way of example of furnaces that are suitable for preparing the clinkers according to the present invention, mention may be made of the furnace described in the international patent application published under the number WO-A-2009/122065. The furnace that is described in this patent application is particularly suitable for preparing clinkers according to the invention since it contributes in complying with the aforementioned thermal profile.

The clinker according to the present invention may be used to prepare a hydraulic binder, for example cement, by grinding, and possibly, adding gypsum, anhydrite or hemihydrate. Hence, the present invention also relates to a hydraulic binder comprising a clinker as previously described in ground form. Preferably, the hydraulic binder according to the present invention also comprises an additional amount of gypsum, anhydrite or hemihydrate, in proportions ranging up to 20%.

The hydraulic binder according to the present invention may also comprise additives of the same type as those used for Portland cement such as, for example, limestone, natural or artificial pozzolanas, blast furnace slag, fly ashes of burning coal and silica fumes. This addition is carried out by mixing before or after grinding the constituents, by mixing powders or by co-grinding. Therefore, the binder is set as a result of the activation of the additives by the clinker. Consequently, the economy of $CO_2$ may be considerable, in comparison with a GEM I type cement (in accordance with the norm EN 197-1). Depending on the content of the additives, this economy may reach a reduction of 90% of $CO_2$ emissions.

In addition, in order to improve the mechanical performances of the hydraulic binder, it is possible to add from 1 to 5% finely-ground limestone ($CaCO_3$) (or "filler"). Adding the "filler" may be carried out by mixing before or after grinding the constituents, by mixing the powders or by co-grinding.

Finally, the present invention also relates to the different products that are prepared from the aforementioned binder, in particular grout, concrete and mortar. Thus, another object of the present invention consists of grout, concrete and mortar comprising the hydraulic binder as previously described.

The present invention may be illustrated, in a non-limiting manner, by the following examples.

EXAMPLE 1

Clinkers 1 and 2

Several raw mixes have been prepared with the raw materials of which the chemical analyses are reported in mass percentages in the following tables.

Bauxite

TABLE 1

| elements | Bauxite 1 | Bauxite 2 |
|---|---|---|
| $SiO_2$ (in %) | 22.13 | 14.24 |
| $Al_2O_3$ (in %) | 38.8 | 52.23 |
| CaO (in %) | 2.44 | 1.2 |
| MgO (in %) | 0.17 | 0.14 |
| $Fe_2O_3$ (in %) | 20.31 | 12.44 |
| $TiO_2$ (in %) | 1.85 | 3.19 |
| $K_2O$ (in %) | 0.1 | 0.06 |
| $Na_2O$ (in %) | 0 | 0 |
| $P_2O_5$ (in %) | 0.18 | 0.21 |
| $Mn_2O_3$ (in %) | 0.03 | 0.03 |
| $SO_3$ (in %) | 0.07 | 0.41 |
| Others (in %) | 0.17 | 0.03 |
| Loss-on-ignition (in %) | 13.75 | 15.4 |
| Total | 100 | 99.58 |

By "loss-on-ignition", is meant the mass loss that is observed after baking at 950° C.

Bauxites 1 and 2: Bauxite from the Sodicapei Villeveyrac quarries.

Limestone

TABLE 2

| Elements | Limestone 1 | Limestone 2 |
|---|---|---|
| $SiO_2$ (in %) | 1.77 | 1.55 |
| $Al_2O_3$ (in %) | 2.82 | 0.38 |
| CaO (in %) | 50.8 | 54.51 |
| MgO (in %) | 0.82 | 0.33 |
| $Fe_2O_3$ (in %) | 0.79 | 0.21 |
| $TiO_2$ (in %) | 0.18 | 0.03 |
| $K_2O$ (in %) | 0.05 | 0.04 |
| $Na_2O$ (in %) | 0.02 | 0 |
| $P_2O_5$ (in %) | 0.05 | 0.01 |

TABLE 2-continued

| Elements | Limestone 1 | Limestone 2 |
|---|---|---|
| $Mn_2O_3$ (in %) | 0.01 | 0.01 |
| $SO_3$ (in %) | 1.03 | 0.02 |
| Others (in %) | 0.03 | 0 |
| Loss-on-ignition (in %) | 40.94 | 42.87 |
| Total | 99.31 | 99.96 |

By "loss-on-ignition", is meant the mass loss that is observed after baking at 950° C.

Anhydrite and Gypsum

TABLE 3

| Elements | Gypsum 1 | Gypsum 2 |
|---|---|---|
| $SiO_2$ (in %) | 0.33 | 0 |
| $Al_2O_3$ (in %) | 0.31 | 0 |
| CaO (in %) | 31.18 | 32.81 |
| MgO (in %) | 0.02 | 0 |
| $Fe_2O_3$ (in %) | 0.27 | 0.02 |
| $TiO_2$ (in %) | 0.05 | 0.02 |
| $K_2O$ (in %) | 0.05 | 0.03 |
| $Na_2O$ (in %) | 0.05 | 0.14 |
| $P_2O_5$ (in %) | 0.41 | 0.02 |
| $Mn_2O_3$ (in %) | 0 | 0 |

TABLE 3-continued

| Elements | Gypsum 1 | Gypsum 2 |
|---|---|---|
| $SO_3$ (in %) | 43.99 | 46.29 |
| Others (in %) | 2.32 | 0.02 |
| Loss-on-ignition (in %) | 20.28 | 20.72 |
| Total | 99.26 | 100.07 |

By "loss-on-ignition", is meant the mass loss that is observed after baking at 950° C.

Gypsum 1: a byproduct of the industrial production of phosphoric acid.
Gypsum 2: a Merck branded laboratory product.

Silica and Iron oxides

TABLE 4

| Elements | Silica | Hydroxyapatite | Iron oxide |
|---|---|---|---|
| $SiO_2$ (in %) | 99.31 | 0 | 0 |
| $Al_2O_3$ (in %) | 0 | 0 | 0 |
| CaO (in %) | 0.1 | 55.79 | 0 |
| MgO (in %) | 0 | 0 | 0 |
| $Fe_2O_3$ (in %) | 0.2 | 0 | 100 |
| $TiO_2$ (in %) | 0 | 0 | 0 |
| $K_2O$ (in %) | 0.04 | 0 | 0 |
| $Na_2O$ (in %) | 0.01 | 0 | 0 |
| $P_2O_5$ (in %) | 0 | 42.42 | 0 |
| $Mn_2O_3$ (in %) | 0.02 | 0 | 0 |

TABLE 4-continued

| Elements | Silica | Hydroxyapatite | Iron oxide |
|---|---|---|---|
| $SO_3$ (in %) | 0 | 0 | 0 |
| Others (%) | 0.02 | 0 | 0 |
| Loss-on-ignition (%) | 0.15 | 1.79 | 0 |
| Total | 99.85 | 100 | 100 |

By "loss-on-ignition", is meant the mass loss that is observed after baking at 950° C.

Pure silica such as Sifraco silica.

Pure iron oxide or iron oxide that comes from mining.

As regards Phosphorus, it is possible to use the laboratory hydroxyapatite and/or any organic or mineral source of $P_2O_5$.

Preparation of Clinkers 1 and 2

For each clinker, an intimate mixture of the different constituents has been performed in proportions as reported in the following Table 5 (the percentage of residue on a 100 μm sieve is null).

TABLE 5

| | Bauxite | | Gypsum | | Anhydrite | Limestone | | Silica | Iron oxide | Hydroxyapatite |
|---|---|---|---|---|---|---|---|---|---|---|
| | n° | % | n° | % | (in %) | n° | % | (in %) | (in %) | (in %) |
| Clinker 1 | 1 | 33.6 | 1 | 11.2 | — | 1 | 55.2 | — | — | — |
| Clinker 2 | 2 | 24.4 | 2 | 11.8 | — | 2 | 52.5 | 6.2 | 4 | 1.1 |

A baking in a continuous furnace such as that described in the patent application WO-A-2009/122065, has been carried out at 1295° C. for 69 minutes.

The raw mixture is introduced in the preheater tower and is heated by the counter-flowing gases, progressively as it descends in the tower, from ambient temperature to 1050° C. in 410 minutes.

Afterwards, the material is admitted, via an extractor, in the horizontal section of the continuous furnace, and is conveyed to the clinkering area (1295° C.) in a time period of 30 minutes and the temperature is maintained for 69 minutes.

When exiting the clinkering area, the temperature decreases to 1200° C. in a time period of 6 minutes.

Finally, the clinker is conveyed in the cooler where it undergoes a rapid tempering in order to reach ambient temperature in 10 minutes.

The "actual" chemistry of the obtained clinkers is reported in the following Table 6.

TABLE 6

| | Clinker 1 | Clinker 2 |
|---|---|---|
| $SiO_2$ (in %) | 12.09 | 15.06 |
| $Al_2O_3$ (in %) | 20.42 | 18.39 |
| CaO (in %) | 46.62 | 47.68 |
| MgO (in %) | 0.67 | 0.31 |
| $Fe_2O_3$ (in %) | 10.11 | 10.06 |
| $TiO_2$ (in %) | 1.13 | 1.24 |

TABLE 6-continued

|  | Clinker 1 | Clinker 2 |
|---|---|---|
| $K_2O$ (in %) | 0.11 | 0.07 |
| $Na_2O$ (in %) | 0.03 | 0.01 |
| $P_2O_5$ (in %) | 0.19 | 0.78 |
| $Mn_2O_3$ (in %) | 0.02 | 0.01 |
| $SO_3$ (in %) | 7.59 | 5.81 |
| Others (in %) | 0.3 | 0.03 |
| Loss-on-ignition (in %) | 0.39 | 0.44 |
| Total | 99.67 | 99.89 |

By "loss-on-ignition", is meant the mass loss that is observed after baking at 950° C.

The crystallographic phases that are obtained for each clinker as well as their percentage are reported in the following Table 7.

TABLE 7

|  |  | Clinker 1 | Clinker 2 |
|---|---|---|---|
| $C_4A_xF_y\$_z$ | x | 2.27 | 2.57 |
|  | y | 0.29 | 0.42 |
|  | z | 1 | 1 |
|  | % | 45 | 45.6 |
| $C_6A_{x'}F_{y'}$ | x' | 1 | 0.9 |
|  | y' | 2.37 | 2.1 |
|  | % | 9.8 | 0 |
| $C_2S_\beta$ (in %) |  | 28.9 | 27.9 |
| $C_2S_{\alpha'h}$ (in %) |  | 5.5 | 11.0 |
| Other phases (in %) |  | 10.8 | 15.5 |

EXAMPLE 2

Cement 1 to 3

Preparation of Cement 1

The clinker 1, obtained according to the previous example 1, has been ground with 10% anhydrite so that the percentage of residue on a 100 μm sieve is null.

The cement that is thereby obtained from the clinker 1 is referred to as the cement 1.

Preparation of Cements 2 and 3

The cements 2 and 3 are prepared respectively by grinding the clinkers 1 and 2 with 10.0% anhydrite and 5% limestone filler so that the percentage of residue on a 100 μm sieve is null.

Setting Time

The initial setting time and the final setting time are assessed in accordance with the norm EN196-3 on a pure cement paste with the W/C ratio having been determined by measuring the consistency by means of the Vicat instrument.

The setting times of cements 1 to 3 are reported in the following Table 8.

TABLE 8

|  | Cement 1 | Cement 2 | Cement 3 |
|---|---|---|---|
| W/C | 0.32 | 0.3 | 0.24 |
| Initial setting time (min) | 15 | 23 | 147 |
| Final setting time (min) | 40 | 65 | 222 |

The initial setting time that has been obtained with cement 1 is very short, of the order of 15 min.

The addition of a limestone-based filler to the cement (cement 2) only very slightly affects the initial setting time of said cement.

On the contrary, cement 3 has a significantly increased initial setting time in comparison with cements 1 and 2.

It clearly follows from these results that only the increase of $P_2O_5$ content explains this increase of the initial setting time.

Mechanical Resistance

From these cements, mortar has been prepared, in accordance with the norm EN196-1, with the following composition:
450 g cement;
1350 g standard sand;
225 g water.

The mechanical resistance of the mortar is measured on 4×4×16 cm³ prismatic test specimens which have been prepared at 20° C. using metallic molds, and unmolded after 24 h. Afterwards, the test specimens were stored in water at 20° C. until the end of the measurements.

The resistance of the obtained samples is tested in accordance with the norm EN196-1.

The results of the compressive resistance (Rc) measurements are reported in the following Table 9.

TABLE 9

| | Measurements of the mechanical resistance of mortar | | | |
|---|---|---|---|---|
| | | Compressive resistance (MPa) | | |
| | W/C | 2 days | 7 days | 28 days |
| Cement 1 | 0.5 | 32.6 | 42.1 | 42.4 |
| Cement 2 | 0.5 | 30.0 | 42.8 | 47.9 |
| Cement 3 | 0.5 | 31.7 | 36.6 | 43.9 |

The mechanical resistance of cements 1 to 3 in the short and long term is similar.

Thus, the addition of $P_2O_5$ in the composition of the clinker allows significantly increasing the setting time (see the preceding Table 8) without decreasing the mechanical properties, in the short and long term, of the final cements (see Table 9 above).

The invention claimed is:

1. A sulfo-aluminate-based clinker, having a phase composition, with respect to the total weight of the clinker, comprising:
from 5 to 60% of an iron-doped calcium sulfo-aluminate phase corresponding to a formula represented by $C_4A_xF_y\$_z$ with:
x varying from 2 to 3,
y varying from 0.05 to 0.5, and
z varying from 0.8 to 1.2;
from 0 to 25% of a calcium aluminoferrite phase corresponding to a general formula represented by $C_6A_{x'}F_{y'}$, with x' varying from 0 to 1.5 and y' varying from 0.5 to 3;
from 20 to 70% of a belite $C_2S$ phase;
less than 10% of a $C_{11}S_4B$ phase; and
more than 0.3% of $P_2O_5$,
wherein:
C represents CaO;
A represents $Al_2O_3$;
F represents $Fe_2O_3$;

S represents $SiO_2$; and $ represents $SO_3$.

2. The clinker according to claim 1, wherein the phase composition contains from 10 to 50% of the iron-doped calcium sulfo-aluminate phase $C_4A_xF_y\$_z$.

3. The clinker according to claim 1, wherein x varies from 2.1 to 2.9.

4. The clinker according to claim 1, wherein the phase composition contains from 0 to 20% of the calcium aluminoferrite phase $C_6A_{x'}F_{y'}$.

5. The clinker according to claim 1, wherein x' varies from 0.65 to 1.3 and/or y' varies from 1.5 to 2.5.

6. The clinker according to claim 1, wherein the phase composition contains from 30% to 55% of the belite $C_2S$ phase.

7. The clinker according to claim 1, wherein the phase composition contains less than 5% of the $C_{11}S_4B$ phase.

8. The clinker according to claim 1, wherein the phase composition contains more than 0.5% $P_2O_5$.

9. The clinker according to claim 1, wherein the phase composition contains less than 3% free lime CaO.

10. The clinker according to claim 1, wherein the phase composition contains less than 5% C$.

11. The clinker according to claim 1, wherein the phase composition contains less than 10% $C_2AS$.

12. A method for preparing the clinker according to claim 1 comprising the following steps:

1) preparing a raw mix of raw materials comprising:

from 0.1 to 40% bauxite, marlstones, red muds and/or any other sedimentary, metamorphic or magmatic rocks or industrial mineral derivatives with a high aluminum content;

from 0.1 to 12% gypsum, borogypsum, phosphogypsum, desulphogypsum, anhydrite and/or hemihydrate;

from 0.1 to 65% limestone and/or phosphatic limestone, and/or any other sedimentary, metamorphic or magmatic rocks or industrial mineral derivatives with a high calcium content;

from 0.1 to 20% apatite, hydroxyapatite, and/or any phosphate ore, or calcium phosphate or natural or synthetic, mineral or organic, phosphates;

from 0 to 12% quartz, silica, expanded silica, silica fumes or any other sedimentary, metamorphic or magmatic rocks or industrial mineral derivatives with a high silicon content; and from 0 to 12% iron oxide and/or iron sulfate and/or iron sulfides and/or any other natural or synthetic iron-rich and/or sulfur-rich mineral materials;

2) mixing (optionally, by co-grinding) the raw materials, and 3) baking the mixture of raw materials at a temperature T2 ranging from 1150° C. to 1300° C. according to the following steps:

a) heating the mixture from ambient temperature to a temperature ranging from 800° C. to 1200° C., over a time period t1 ranging from 20 to 500 minutes, b) raising the temperature to the temperature T2, over a time period t2 ranging from 15 to 60 minutes, c) maintaining the temperature at T2, over a time period t3 ranging from 0 to 80 minutes, d) decreasing the temperature from T2 to a temperature T3, T3 being higher than or equal to 1100° C., over a time period t4 ranging from 0 to 15 minutes, and e) tempering the clinker and cooling it rapidly to ambient temperature, over a time period t5 ranging from 5 to 60 minutes.

13. A hydraulic binder comprising the clinker according to claim 1.

14. Grout comprising the hydraulic binder according to claim 13.

15. Concrete comprising the hydraulic binder according to claim 13.

16. Mortar comprising the hydraulic binder according to claim 13.

* * * * *